United States Patent
Jeon et al.

(10) Patent No.: US 9,324,029 B2
(45) Date of Patent: Apr. 26, 2016

(54) METHOD OF DETERMINING A DRIVING TENDENCY, AND CONTROLLING SHIFT ACCORDING TO FUZZY RULES

(71) Applicant: Hyundai Motor Company, Seoul (KR)

(72) Inventors: Byeong Wook Jeon, Seoul (KR); Joseph D. Chang, Yongin-si (KR); Dong Hoon Jeong, Osan-si (KR)

(73) Assignee: Hyundai Motor Company, Seoul (KR)

( * ) Notice: Subject to any disclaimer, the term of this patent is extended or adjusted under 35 U.S.C. 154(b) by 193 days.

(21) Appl. No.: 14/143,638

(22) Filed: Dec. 30, 2013

(65) Prior Publication Data

US 2015/0088802 A1    Mar. 26, 2015

(30) Foreign Application Priority Data

Sep. 26, 2013 (KR) .......................... 10-2013-0114692

(51) Int. Cl.
| | |
|---|---|
| *G06F 15/18* | (2006.01) |
| *G06N 5/04* | (2006.01) |
| *B60K 28/00* | (2006.01) |
| *B60W 10/04* | (2006.01) |
| *B60W 10/10* | (2012.01) |
| *B60W 30/18* | (2012.01) |
| *B60W 40/09* | (2012.01) |
| *B60W 50/00* | (2006.01) |

(52) U.S. Cl.
CPC ................ *G06N 5/048* (2013.01); *B60K 28/00* (2013.01); *B60W 10/04* (2013.01); *B60W 10/10* (2013.01); *B60W 30/18* (2013.01); *B60W 40/09* (2013.01); *B60W 2050/0014* (2013.01); *B60W 2520/10* (2013.01); *B60W 2540/10* (2013.01); *B60W 2550/14* (2013.01); *B60W 2550/30* (2013.01); *B60W 2550/402* (2013.01)

(58) Field of Classification Search
CPC ............ B60W 2540/10; B60W 40/09; B60W 2540/30; B60W 2550/142; F16H 2061/0081
USPC ................................................ 706/12, 45, 62
See application file for complete search history.

(56) References Cited

U.S. PATENT DOCUMENTS

| | | | | |
|---|---|---|---|---|
| 5,555,170 A | * | 9/1996 | Nakashima | ............. F16H 59/66 477/120 |
| 5,863,105 A | * | 1/1999 | Sano | ................... B60T 8/17552 303/140 |

(Continued)

FOREIGN PATENT DOCUMENTS

| | | |
|---|---|---|
| JP | 09-501482 A | 2/1997 |
| JP | 2006-097740 A | 4/2006 |

(Continued)

*Primary Examiner* — David Vincent
(74) *Attorney, Agent, or Firm* — Morgan, Lewis & Bockius LLP

(57) ABSTRACT

A method of determining a short term driving tendency and a system of controlling shift using the same that reflects precisely a will of a driver on the shift by determining a short term driving tendency is disclosed. The method may include detecting input variables, determining whether determination condition of the short term driving tendency is satisfied, calculating tendencies and output membership function values according to a plurality of fuzzy rules based on the input variables if the determination condition of the short term driving tendency is satisfied, and determining a short term driving tendency index based on the tendencies and the output membership function values according to the plurality of fuzzy rules.

12 Claims, 8 Drawing Sheets

(56) References Cited

U.S. PATENT DOCUMENTS

| | | | | |
|---|---|---|---|---|
| 5,906,560 A * | 5/1999 | Minowa | ............... | B60K 28/165 477/97 |
| 6,033,041 A * | 3/2000 | Koga | ........................ | B60L 7/12 188/159 |
| 6,125,314 A * | 9/2000 | Graf | ........................ | B60T 8/174 701/53 |
| 2002/0013650 A1 * | 1/2002 | Kusafuka | ............ | F16H 61/0213 701/51 |
| 2005/0134440 A1 * | 6/2005 | Breed | .................. | B60N 2/2863 340/435 |
| 2011/0172864 A1 * | 7/2011 | Syed | ...................... | B60K 6/445 701/22 |

FOREIGN PATENT DOCUMENTS

| | | |
|---|---|---|
| JP | 2013-83498 A | 5/2013 |
| KR | 1999-0050643 A | 7/1999 |
| KR | 1020090055686 A | 6/2009 |

\* cited by examiner

FIG. 5

| | input variables | | | | tendency |
|---|---|---|---|---|---|
| | vehicles speed | APS | Δ APS | gradient | |
| Rule 1 | low<br>MF1-L | middle<br>MF2-M | middle<br>MF3-M | - | normal |
| Rule 2 | low<br>MF1-L | middle<br>MF2-M | high<br>MF3-H | - | sporty |
| Rule 3 | high<br>MF1-H | high<br>MF2-H | high<br>MF3-H | - | sporty |
| Rule 4 | - | middle<br>MF2-M | - | high<br>MF4-H | normal | mild normal sporty

METHOD OF DETERMINING A DRIVING TENDENCY, AND CONTROLLING SHIFT ACCORDING TO FUZZY RULES

CROSS-REFERENCE TO RELATED APPLICATION

The present application claims priority of Korean Patent Application Number 10-2013-0114692 filed on Sep. 26, 2013, the entire contents of which application are incorporated herein for all purposes by this reference.

BACKGROUND OF INVENTION

1. Field of Invention

The present invention relates to a method of determining a short term driving tendency and a system of controlling shift using the same. More particularly, the present invention relates to a method of determining a short term driving tendency and a system of controlling shift using the same that reflects a will of a driver on the shift precisely by determining a short term driving tendency further precisely.

2. Description of Related Art

Customer satisfaction related to driving performance of a vehicle depends on how precisely the vehicle runs in accordance with a tendency of the customer. While tendencies of the customers vary, however, performance characteristic of the vehicle is set to one performance characteristic in the same vehicle model. Therefore, reaction of the vehicle may not coincide with the tendency of the customer. Accordingly, the customer often lodges a complaint against the driving performance of the vehicle. That is, if the driving tendency of the customer is grasped and a shift of the vehicle is controlled to coincide with the tendency of the customer, the customer satisfaction related to the driving performance may be maximized.

Therefore, many methods of learning the driving tendency of the customer for a long time and controlling the shift according to the learned driving tendency have been developed. The method of controlling the shift according to the learned driving tendency is performed under the assumption that the driving tendency of the customer is constant. The driving tendency of the driver, however, is not constant and changes according to temporary changes of driver's feeling or driving will, road condition and so on. Therefore, the learned driving tendency may differ greatly from an actual driving tendency of the driver at one point. If the shift is controlled according to the learned driving tendency, the actual driving will of the driver may not be reflected on the shift and the driver may dissatisfy with the driving performance.

For example, if the driver pushes the accelerator pedal deeply, a conventional system of controlling shift cannot differentiate between the driver pushes the accelerator pedal deeply so as to drive the vehicle on an uphill road and to increase a vehicle speed. Therefore, wrong shift may be controlled and the driver may dissatisfy with the driving performance.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method of determining a short term driving tendency and a system of controlling shift using the same having advantages of reflecting a will of a driver on the shift further precisely by precisely determining a short term driving tendency of the driver that is a driving tendency for a short time (e.g., for a current driving or for a predetermined time in the current driving).

A method of determining a short term driving tendency according to various aspects of the present invention may include: detecting input variables; determining whether determination condition of the short term driving tendency is satisfied; calculating tendencies and output membership function values according to a plurality of fuzzy rules based on the input variables if the determination condition of the short term driving tendency is satisfied; and determining a short term driving tendency index based on the tendencies and the output membership function values according to the plurality of fuzzy rules.

Determination condition of the short term driving tendency may be satisfied if a distance to a preceding vehicle is greater than or equal to a predetermined distance, a curvature radius of an ahead road is greater than or equal to a predetermined curvature radius, a gradient of a road is smaller than or equal to a predetermined gradient, or a road state is not a slippery road, an icy road, a rough road, or an unpaved road. The input variables may include an accelerator pedal position, a change rate of the accelerator pedal position, a vehicle speed and a gradient of a road.

Calculating the tendencies and the output membership function values according to the plurality of fuzzy rules based on the input variables may include calculating a tendency and an output membership function value according to each fuzzy rule in the plurality of fuzzy rules. Calculating the tendency and the output membership function value according to each fuzzy rule may include: determining whether the input variables satisfy the respective fuzzy rule; selecting a tendency and an output membership function according to the respective fuzzy rule if the respective fuzzy rule is satisfied; calculating input membership function values according to the input variables included in the respective fuzzy rule; calculating a minimum value of the input membership function values; and setting the minimum value as the output membership function value according to the respective fuzzy rule. Calculating the tendency and the output membership function value according to each fuzzy rule may further include setting a predetermined tendency and a predetermined value as the tendency and the output membership function value according to the respective fuzzy rule if the input variables do not satisfy the respective fuzzy rule.

Determining the short term driving tendency index may include: overlapping the plurality of output membership functions on one short term tendency index graph; calculating a center of an area occupied by the plurality of output membership function values on the short term tendency index graph; and setting the center as the short term driving tendency index.

Four fuzzy rules, three tendencies including mild, normal and sporty and output membership functions according to each tendency may be preset. A first fuzzy rule may be that if the vehicle speed is low, the accelerator pedal position is middle, and the change rate of the accelerator pedal position is middle, the tendency is normal. A second fuzzy rule may be that if the vehicle speed is low, the accelerator pedal position is middle, and the change rate of the accelerator pedal position is high, the tendency is sporty. A third fuzzy rule may be that if the vehicle speed is high, the accelerator pedal position is high, and the change rate of the accelerator pedal position is high, the tendency is sporty. A fourth fuzzy rule may be that if the accelerator pedal position is middle and the gradient of the road is high, the tendency is normal.

A system of controlling shift according to various aspects of the present invention may include: an accelerator pedal position sensor detecting an accelerator pedal position; a vehicle speed sensor detecting a vehicle speed; a navigation device configured to provide road information including a gradient of a road; a controller receiving information on input variables including the accelerator pedal position, the vehicle speed and the gradient of the road from the accelerator pedal position sensor, the vehicle speed sensor and the navigation device, determining a short term driving tendency of a driver based on the information, and controlling an engine or a transmission according to the short term driving tendency, wherein the controller calculates tendencies and output membership function values according to a plurality of fuzzy rules based on the input variables and determines the short term driving tendency based on the tendencies and the output membership function values according to the plurality of fuzzy rules.

The controller may determine the short term driving tendency when a distance to a preceding vehicle is greater than or equal to a predetermined distance, a curvature radius of an ahead road is greater than or equal to a predetermined curvature radius, the gradient of the road is smaller than or equal to a predetermined gradient, or a road state is not a slippery road, an icy road, a rough road, or an unpaved road.

The controller may calculate the tendencies and the output membership function values according to the plurality of fuzzy rules based on the input variables by calculating the tendency and the output membership function value according to each fuzzy rule. The controller may calculate the tendency and the output membership function value according to each fuzzy rule by selecting the tendency and the output membership function according to the respective fuzzy rule, calculating input membership function values according to the input variables included in the respective fuzzy rule, and calculating a minimum value of the input membership function values as the output membership function value according to the respective fuzzy rule.

The controller may determine whether the input variables satisfy the respective fuzzy rule, may select the tendency and the output membership function according to the respective fuzzy rule if the respective fuzzy rule is satisfied, and may set a predetermined tendency and a predetermined value as the tendency and the output membership function value according to the respective fuzzy rule if the respective fuzzy rule is not satisfied.

The controller may determine the short term driving tendency by overlapping the plurality of output membership functions on one short term tendency index graph, and calculating a center of an area occupied by the plurality of output membership function values on the short term tendency index graph.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a table showing exemplary fuzzy rules.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
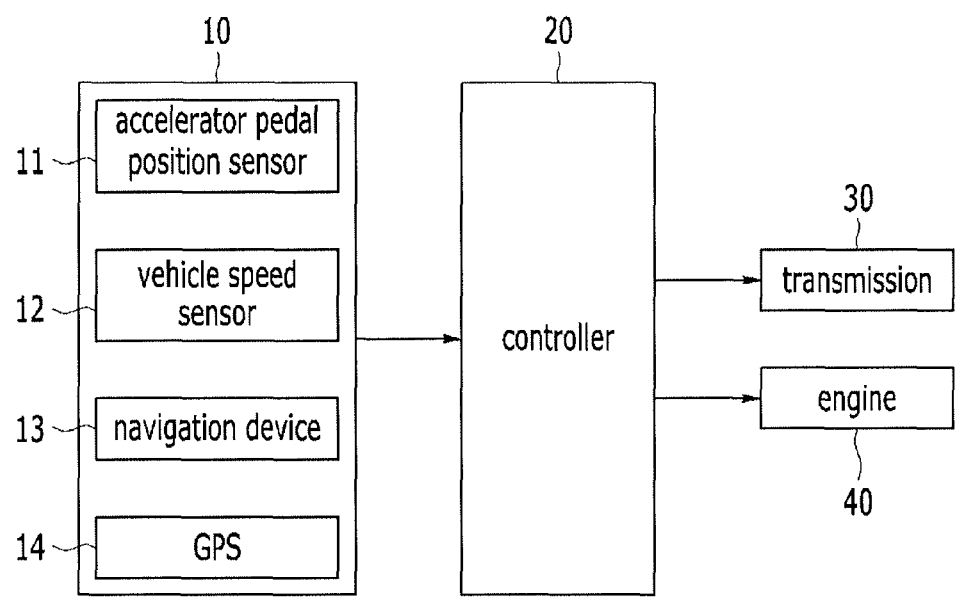
FIG. 1 is a block diagram of an exemplary system of controlling shift according to the present invention.

FIG. 1 is a block diagram of a system of controlling shift according to various embodiments of the present invention. As shown in FIG. 1, a system of controlling shift includes a data detector 10, a controller 20, an engine 30 and a transmission 40.

The data detector 10 detects data for determining a short term driving tendency of a driver, and the data detected by the data detector 10 is transmitted to the controller 20. The data detector 10 includes an accelerator pedal position sensor 11, a vehicle speed sensor 12, a navigation device 13 and a global positioning system (GPS) 14.

The accelerator pedal position sensor 11 detects a degree with which a driver pushes an accelerator pedal. That is, the accelerator pedal position sensor 11 detects the data related to driver's acceleration will.

The vehicle speed sensor 12 detects a vehicle speed, and is mounted at a wheel of the vehicle. In some cases, the vehicle speed may be calculated based on a GPS signal received by the GPS 14.

Meanwhile, a target shift-speed may be calculated by using a shift pattern based on the signal of the accelerator pedal position sensor 11 and the signal of the vehicle speed sensor 12, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, current applied to a plurality of synchronizer devices and actuators is controlled in a double clutch transmission.

The navigation device 13 is a device which informs the driver of a route to a destination. The navigation device 13 includes an input/output portion inputting or outputting information for guidance of the route, a current position detecting portion detecting information on a current position of the vehicle, a memory in which a map data for calculating the route and a data for guiding the route are stored, and a control portion for searching the route and performing guidance of the route. However, it is sufficient in an exemplary embodiment of the present invention that the navigation device 13 can provide information on a road shape such as a gradient of a road or a curvature radius of the road to the controller 20. Therefore, it is to be understood that the navigation device 13 includes any device which can provide the information on the road shape to the controller 20 in this specification and the claims.

The GPS 14 receives a signal transmitted from a GPS satellite and transmits a signal corresponding thereto to the navigation device 13.

The controller 20 determines a short term driving tendency of the driver that is a driving tendency for a comparatively short time based on the data detected by the data detector 10. That is, the controller 20 determines the driving tendency of the driver, for example, during a current driving or for a predetermined time in the current driving. The short term driving tendency of the driver may be determined based on how well one or more assumptions related to the driving tendency of the driver are satisfied, and fuzzy control theory may be used to determine the short term driving tendency of the driver. For these purposes, the controller 20 can be realized by one or more processors activated by a predetermined program, and the predetermined program can be programmed to perform each step of a method of determining a short term driving tendency according to an exemplary embodiment of the present invention.

In addition, the controller 20 controls the transmission 30 or the engine 40 according to the short term driving tendency. That is, the controller 20 may change a shift pattern, engaging feeling to the target shift-speed, an engine torque map and/or an engine torque filter according to the short term driving tendency.

Figure 2:
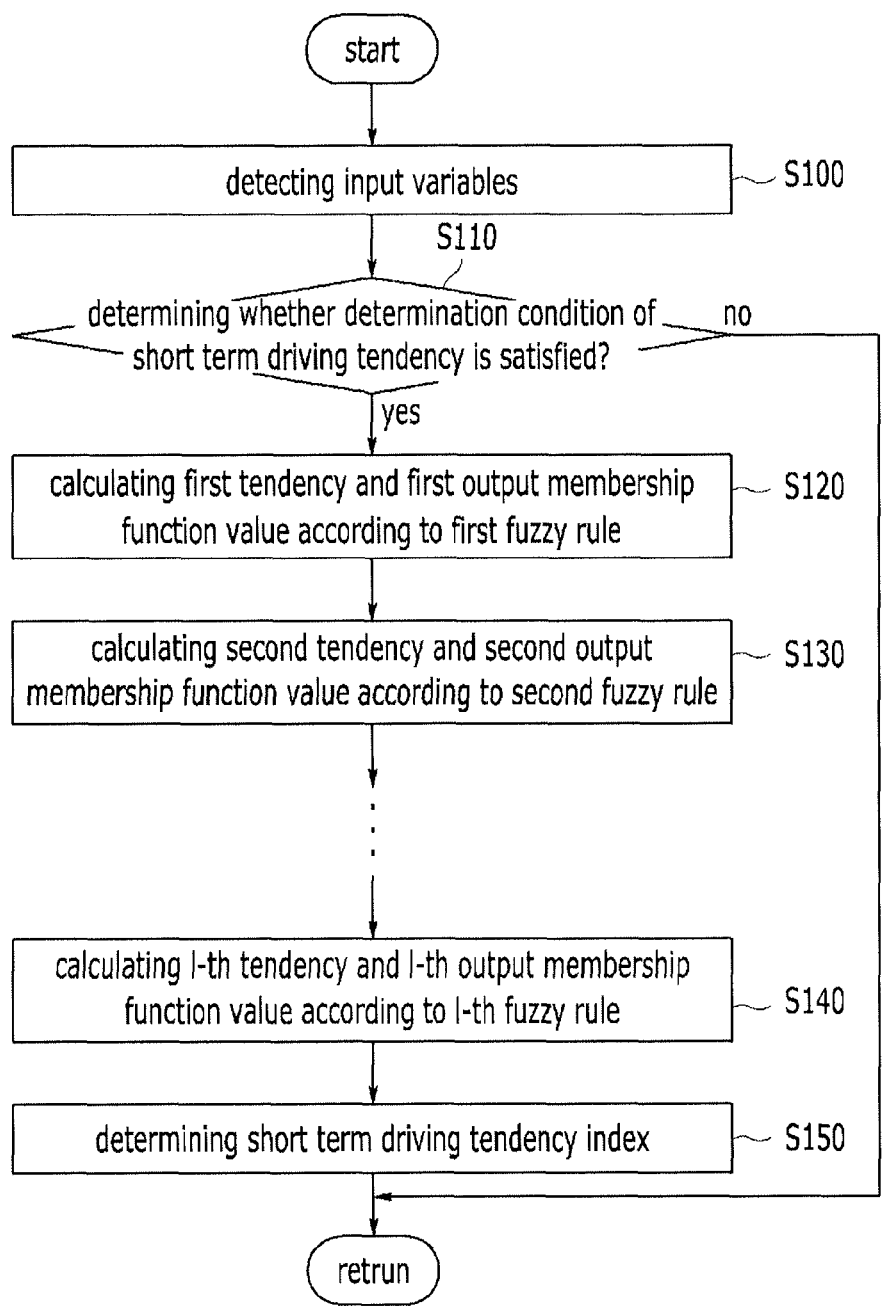
FIG. 2 is a flowchart of an exemplary method of determining a short term driving tendency according to the present invention.
Figure 3:
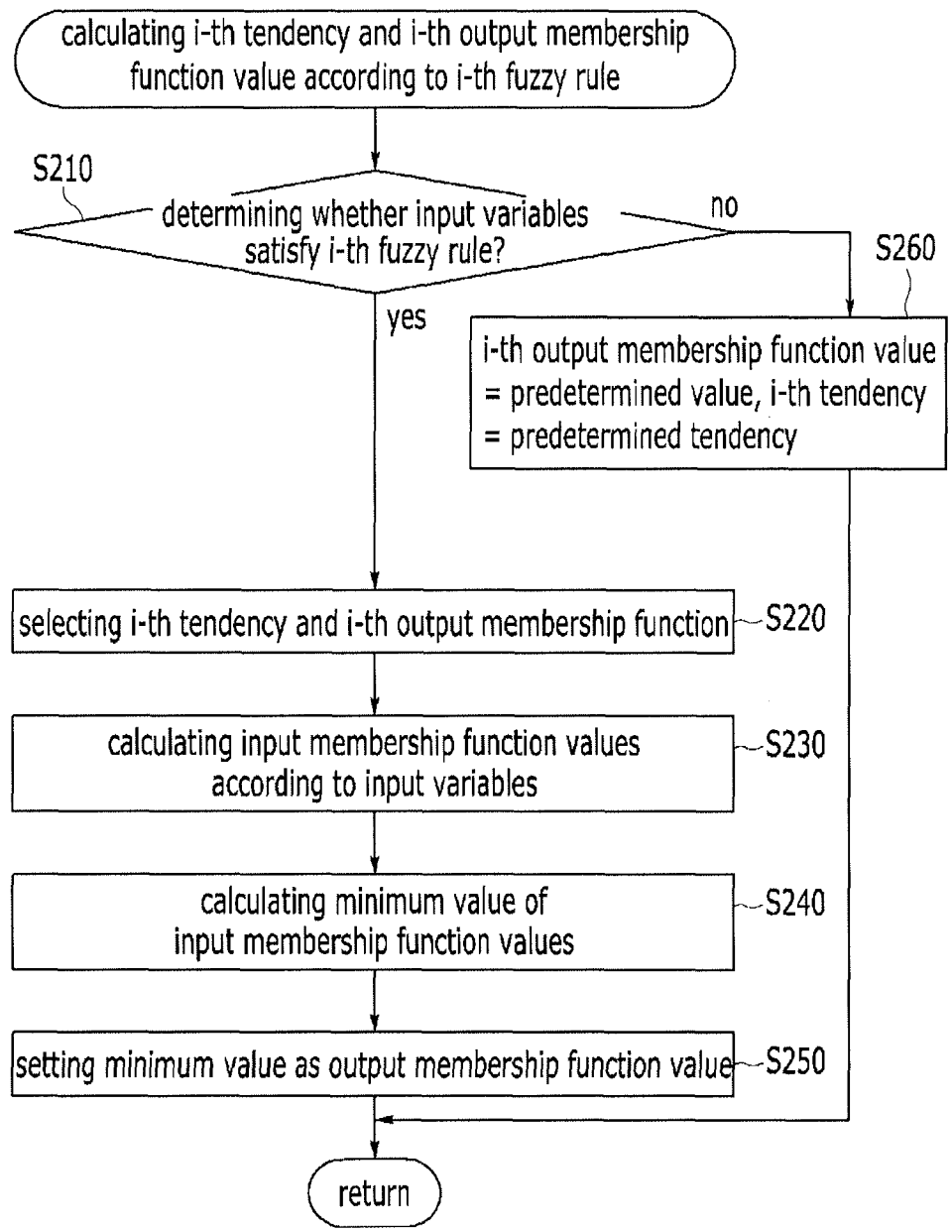
FIG. 3 is a flowchart of calculating an i-th tendency and an i-th output membership function value according to an i-th fuzzy rule in an exemplary method of determining a short term driving tendency according to the present invention.
Figure 4:
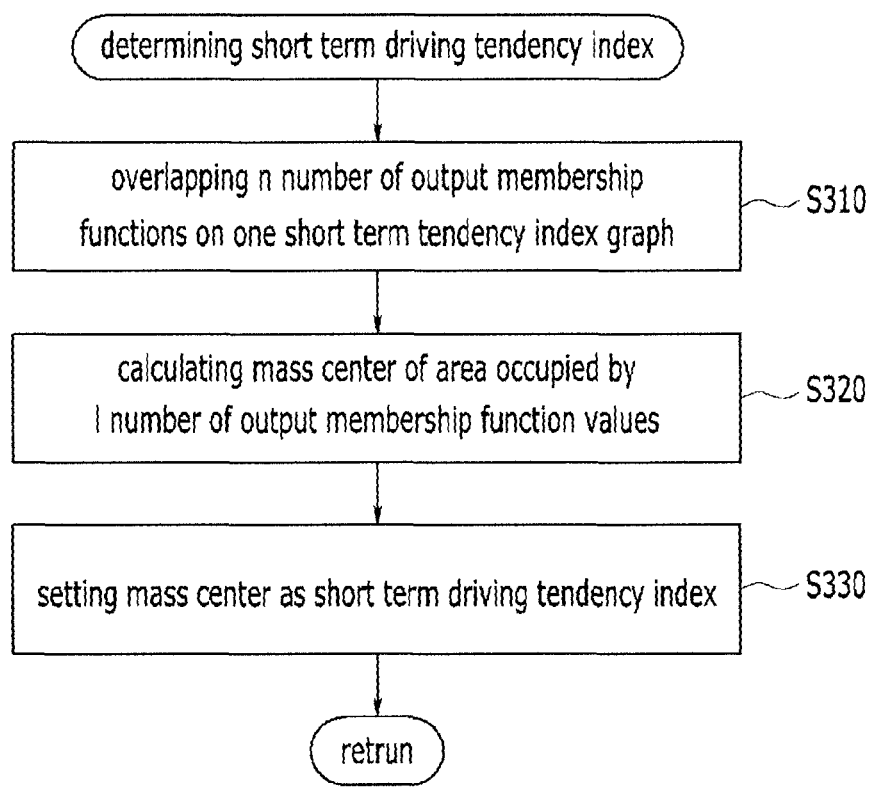
FIG. 4 is a flowchart of determining a short term tendency index in an exemplary method of determining a short term driving tendency according to the present invention.

Hereinafter, referring to FIG. 2 to FIG. 4, a method of determining a short term driving tendency according to various embodiments of the present invention will be described in detail. FIG. 2 is a flowchart of a method of determining a short term driving tendency, FIG. 3 is a flowchart of calculating an i-th tendency and an i-th output membership function value according to an i-th fuzzy rule in a method of determining a short term driving tendency, and FIG. 4 is a flowchart of determining a short term tendency index in a method of determining a short term driving tendency according to various embodiments of the present invention.

As shown in FIG. 2, a method of determining a short term driving tendency according to various embodiments of the present invention begins with detecting input variables at step S100. If the data detector 10 detects the data and transmits the data to the controller 20, the controller 20 determines whether determination condition of the short term driving tendency is satisfied at step S110. For example, the determination condition of the short term driving tendency may be satisfied, but is not limited, if a distance to a preceding vehicle is greater than or equal to a predetermined distance, a curvature radius of an ahead road is greater than or equal to a predetermined curvature radius, a gradient of a road is smaller than or equal to a predetermined gradient, or a road state is not a slippery road, an icy road, a rough road, or an unpaved road.

If the determination condition of the short term driving tendency is not satisfied at the step S110, the controller 20 finishes the method of determining the short term driving tendency according to various embodiments of the present invention. If the determination condition of the short term driving tendency is satisfied at the step S110, the controller 20 calculates a first tendency and a first output membership function value according to a first fuzzy rule at step S120 and calculates a second tendency and a second output membership function value according to a second fuzzy rule at step S130. Calculation of the tendency and the output membership function value is repeated by the predetermined number (e.g., L) of fuzzy rules.

If the controller 20 calculates an l-th (L-th) tendency and an l-th (L-th) output membership function value according to an l-th (L-th) fuzzy rule at step S140, the controller 20 determines a short term driving tendency index based on the calculated tendencies and output membership function values at step S150. After that, the controller 20 finishes the method of determining the short term driving tendency according to the exemplary embodiment of the present invention and controls the transmission 30 or the engine 40 based on the short term driving tendency index.

Hereinafter, calculation of an i-th tendency and an i-th output membership function value according to an i-th fuzzy rule will be described in detail. Firstly, as shown in FIG. 3, the controller 20 determines whether the input variables satisfy the i-th fuzzy rule at step S210. The i-th fuzzy rule may be assumption that can be suitable to determine the short term driving tendency of the driver and may be set in advance.

If the input variables do not satisfy the i-th fuzzy rule at the step S210, the controller 20 sets a predetermined value and a predetermined tendency as the i-th output membership function value and the i-th tendency at step S260, and exits from the calculation of the i-th tendency and the i-th output membership function value according to the i-th fuzzy rule.

If the input variables satisfy the i-th fuzzy rule at the step S210, the controller 20 selects the i-th tendency and the i-th output membership function at step S220. The i-th output membership function may be set according to the i-th tendency. After that, the controller 20 calculates input membership function values according to the input variables included in the i-th fuzzy rule at step S230. If the input membership function values according to a plurality of input variables are calculated at the step S230, the controller 20 calculates a minimum value of the input membership function values at step S240. After that, the controller 20 sets the minimum value as the i-th output membership function value, and exits from the calculation of the i-th tendency and the i-th output membership function value according to the i-th fuzzy rule.

Figure 7:
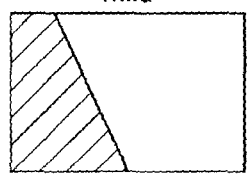
FIG. 7 is a graph showing exemplary output membership functions.
Figure 7:
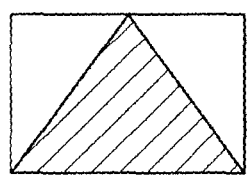
Figure 7:
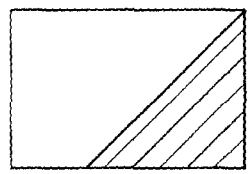

Hereinafter, determination of a short term tendency index will be described in detail. As shown in FIG. 4, the controller 20 overlaps the predetermined n number of output membership functions on one short term tendency index graph at step S310. In various exemplary embodiments, the number of the output membership functions may be three, as shown in FIG. 7. However, the number of the output membership functions is not limited to three. After that, the controller 20 calculates a center (e.g., geometric, weighted or mass center) of an area occupied by the L number of the output membership function values at step S320, and sets the center as the short term driving tendency index at step S330.

Hereinafter, the method of determining the short term driving tendency according to the exemplary embodiment of the present invention will be described in further detail with reference to FIG. 5 to FIG. 8. It is to be understood that the description exemplifies just one example and scope of the present invention is not limited to the description.

Figure 6:
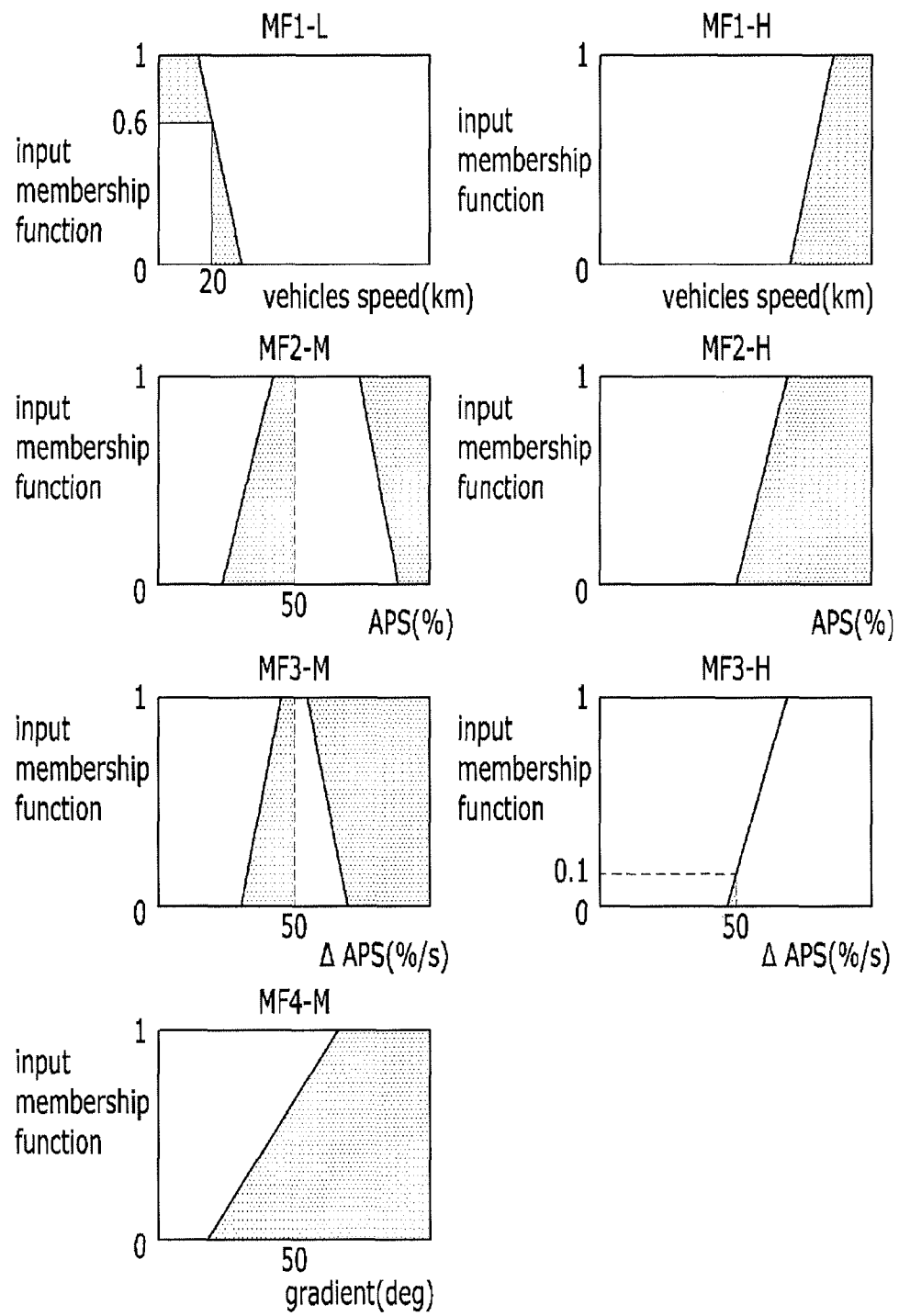
FIG. 6 is a graph showing exemplary input membership functions.
Figure 8:
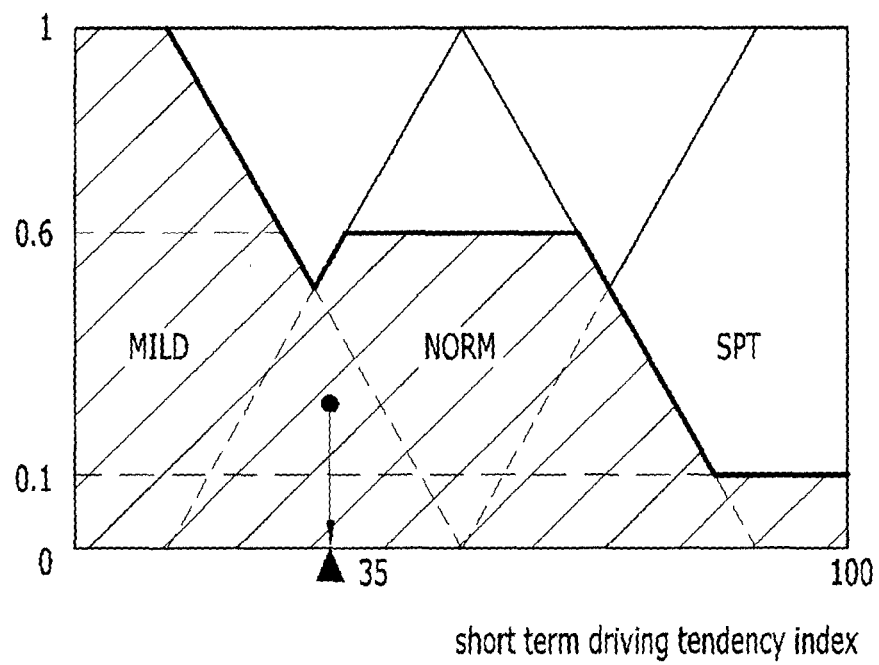
FIG. 8 is a graph explaining determination of a short term driving tendency index in an exemplary method of determining a short term driving tendency according to the present invention.

FIG. 5 is a table showing exemplary fuzzy rules, FIG. 6 is a graph showing exemplary input membership functions, FIG. 7 is a graph showing exemplary output membership functions, and FIG. 8 is a graph for explaining determination of a short term driving tendency index according to an exemplary embodiment of the present invention.

As shown in FIG. 5, four fuzzy rules are used and the input variables included in the four fuzzy rules are the accelerator pedal position, the change rate of the accelerator pedal position, the vehicle speed and the gradient of the road in one example for explaining the method of determining the short term driving tendency index.

In addition, as shown in FIG. 6, at least one input membership function for each input variable is predetermined. For example, two input membership functions for the vehicle speed, that is the input membership function (MF1-L) for a low vehicle speed and the input membership function (MF1-H) for a high vehicle speed are predetermined. Herein, a state of the input variables is denoted by a "low" state, a "middle" state and a "high" state due to characteristics of fuzzy control, but is not limited thereto.

In addition, as shown in FIG. 7, the output membership functions are also predetermined. Three output membership functions (i.e., an output membership function for a "mild", an output membership function for a "normal", and an output membership function for a "sporty") are used in one example for explaining the method of determining the short term driving tendency index, but are not limited thereto. The output membership functions are determined according to the tendencies. That is, if any fuzzy rule is satisfied and the tendency is determined to be the "mild", the output membership function for the "mild" is used.

Referring FIG. 5 again, a first fuzzy rule is that 'the vehicle speed is "low", the accelerator pedal position is "middle", and the change rate of the accelerator pedal position is "middle", the tendency is the "normal"'. A second fuzzy rule is that 'the vehicle speed is "low", the accelerator pedal position is "middle", and the change rate of the accelerator pedal position is "high", the tendency is the "sporty". A third fuzzy rule is that 'the vehicle speed is "high", the accelerator pedal position is "high", and the change rate of the accelerator pedal position is "high", the tendency is the "sporty"'. A fourth fuzzy rule is that 'the accelerator pedal position is "middle" and the gradient of the road is "high", the tendency is the "normal"'.

A case where the vehicle speed is 20 km/h, the accelerator pedal position is 50% (the accelerator pedal position is 0% if the accelerator pedal is not pushed, and the accelerator pedal position is 100% if the accelerator pedal is completely pushed), and the change rate of the accelerator pedal position is 50%/s will be exemplified.

If the vehicle speed is 20 km/h, the controller 20 can determine that the vehicle speed is "low" or the vehicle speed is "middle". If the accelerator pedal position is 50%, the controller 20 can determined that the accelerator pedal position is "low", "middle", or "high". In addition, the change rate of the accelerator pedal position is 50%/s, the controller can determine that the change rate of the accelerator pedal position is "low", "middle", or "high".

The controller 20 determines the fuzzy rules that are satisfied by the input variables. Based on the above-determined results on the input variables, the controller 20 determines that the input variables satisfy the first fuzzy rule and the second fuzzy rule, and do not satisfy the third fuzzy rule and the fourth fuzzy rule.

Meanwhile, as described above, if the input variables do not satisfy the i-th fuzzy rule, the controller 20 can set the predetermined value and the predetermined tendency as the i-th output membership function value and the i-th tendency. The predetermined tendency may be the "mild" and the predetermined value may be 1 in one example for explaining the method of determining the short term driving tendency index.

Resultantly, the controller 20 determines that the tendency according to the first fuzzy rule is the "normal", the tendency according to the second fuzzy rule is the "sporty", the tendency according to the third fuzzy rule is the "mild", and the tendency according to the fourth fuzzy rule is the "mild".

Referring to FIG. 6 again, if the vehicle speed is 20 km/h, the input membership function value is 0.6 in the input membership function (MF1-L) for the low vehicle speed. If the accelerator pedal position is 50%, the input membership function value is 1 in the input membership function (MF2-M) for a middle accelerator pedal position. If the change rate of the accelerator pedal position is 50%/s, the input membership function value is 1 in the input membership function (MF3-M) for a middle change rate of the accelerator pedal position. If the change rate of the accelerator pedal position is 50%/s, the input membership function value is 0.1 in the input membership function (MF3-M) for a high change rate of the accelerator pedal position.

If the controller 20 calculates the input membership function values according to the input variables included in the first fuzzy rule and the input membership function values according to the input variables included in the second fuzzy rule, as described above, the controller 20 calculates the minimum value of the input membership function values according to the corresponding fuzzy rule as the output membership function value according to the corresponding fuzzy rule.

Resultantly, the controller 20 calculates that the output membership function value according to the first fuzzy rule is 0.6, the output membership function value according to the second fuzzy rule is 0.1, the output membership function value according to the third fuzzy rule is 1, and the output membership function value according to the fourth fuzzy rule is 1.

After that, the controller 20 overlaps the output membership functions shown in FIG. 7 on one short term tendency index graph (referring to FIG. 8). In FIG. 8, y-axis represents the output membership function value and x-axis represents the short term driving tendency index.

After that, the controller 20 marks the output membership function value according to each fuzzy rule on the corresponding output membership function. That is, 0.6 that is the output membership function value according to the first fuzzy rule is marked on the output membership function for the "normal" tendency, 0.1 that is the output membership function value according to the second fuzzy rule is marked on the output membership function for the "sporty" tendency, 1 that is the output membership function value according to the third fuzzy rule is marked on the output membership function for the "mild" tendency, and 1 that is the output membership function value according to the fourth fuzzy rule is marked on the output membership function for the "mild" tendency (referring to a hatched portion in FIG. 8).

After that, the controller 20 calculates the center (e.g., geometric, weighted or mass center) of the area occupied by the four output membership function values (since x value represents the short term driving tendency index in FIG. 8, x value of the center is calculated), and sets the center as the short term driving tendency index. That is, 35 is set as the short term driving tendency index in FIG. 8. If the short term driving tendency index is set, the controller 20 controls shift according to the short term driving tendency index.

As described above, the short term driving tendency of the driver can be determined precisely according to an exemplary embodiment of the present invention. Therefore, a will of the driver can be reflected on the shift precisely. In addition, one would appreciate that values used herein (e.g., 20 km/h, 50%, 0.1, 0.6 or 35) are readily adjustable.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of determining a driving tendency comprising:
   detecting, by a controller, input variables;
   determining, by the controller, whether determination condition of the driving tendency is satisfied;
   calculating, by the controller, tendencies and output membership function values according to a plurality of fuzzy rules based on the input variables if the determination condition of the driving tendency is satisfied; and
   determining, by the controller, a driving tendency index based on the tendencies and the output membership function values according to the plurality of fuzzy rules,
   wherein the calculating the tendencies and the output membership function values according to the plurality of fuzzy rules based on the input variables includes calculating a tendency and an output membership function value according to each fuzzy rule in the plurality of fuzzy rules, and wherein the calculating the tendency and the output membership function value according to each fuzzy rule comprises:
   determining whether the input variables satisfy the respective fuzzy rule;
   selecting the tendency and the output membership function according to the respective fuzzy rule if the respective fuzzy rule is satisfied;
   calculating input membership function values according to the input variables included in the respective fuzzy rule;
   calculating a minimum value of the input membership function values;
   setting the minimum value as the output membership function value according to the respective fuzzy rule; and
   wherein the calculating the tendency and the output membership function value according to each fuzzy rule further comprising:
   setting a predetermined tendency and a predetermined value as the tendency and the output membership function value according to the respective fuzzy rule if the input variables do not satisfy the respective fuzzy rule.

2. The method of claim 1, wherein the determination condition of the driving tendency is satisfied if a distance to a preceding vehicle is greater than or equal to a predetermined distance, a curvature radius of an ahead road is greater than or equal to a predetermined curvature radius, a gradient of a road is smaller than or equal to a predetermined gradient, or a road state is not a slippery road, an icy road, a rough road, or an unpaved road.

3. The method of claim 1, wherein the input variables include an accelerator pedal position, a change rate of the accelerator pedal position, a vehicle speed, and a gradient of a road.

4. The method of claim 1, wherein the determining the driving tendency index comprises:
   overlapping the plurality of output membership functions on one tendency index graph;
   calculating a center of an area occupied by the plurality of output membership function values on the tendency index graph; and
   setting the center as the driving tendency index.

5. The method of claim 3, wherein four fuzzy rules, three tendencies including mild, normal and sporty and output membership functions according to each tendency are preset.

6. The method of claim 5, wherein a first fuzzy rule is that if the vehicle speed is lower than a predetermined value, the accelerator pedal position is in a predetermined position and the change rate of the accelerator pedal position is at a predetermined value, the tendency is normal.

7. The method of claim 5, wherein a second fuzzy rule is that if the vehicle speed is lower than a predetermined value, the accelerator pedal position is in a predetermined position and the change rate of the accelerator pedal position is higher than a predetermined value, the tendency is sporty.

8. The method of claim 5, wherein a third fuzzy rule is that if the vehicle speed is higher than a predetermined value, the accelerator pedal position is higher than a predetermined value and the change rate of the accelerator pedal position is higher than a predetermined value, the tendency is sporty.

9. The method of claim 5, wherein a fourth fuzzy rule is that if the accelerator pedal position is in a predetermined position and the gradient of the road is higher than a predetermined value, the tendency is normal.

10. A system of controlling shift comprising:
    an accelerator pedal position sensor detecting an accelerator pedal position;
    a vehicle speed sensor detecting a vehicle speed;
    a navigation device configured to provide road information including a gradient of a road;
    a controller receiving information on input variables including the accelerator pedal position, the vehicle speed and the gradient of the road from the accelerator pedal position sensor, the vehicle speed sensor and the navigation device, determining a driving tendency of a driver based on the information, and controlling an engine or a transmission according to the driving tendency,
    wherein the controller calculates tendencies and output membership function values according to a plurality of fuzzy rules based on the input variables and determines the driving tendency based on the tendencies and the output membership function values according to the plurality of fuzzy rules,
    wherein the controller calculates the tendencies and the output membership function values according to the plurality of fuzzy rules based on the input variables by calculating a tendency and the output membership function value according to each fuzzy rule,
    wherein the controller calculates the tendency and the output membership function value according to each fuzzy rule by selecting the tendency and the output membership function according to the respective fuzzy rule, calculating input membership function values according to the input variables included in the respective fuzzy rule, and calculating a minimum value of the input membership function values as the output membership function value according to the respective fuzzy rule, wherein the controller determines whether the input variables satisfy the respective fuzzy rule, selects the tendency and the output membership function according to the respective fuzzy rule if the respective fuzzy rule is satisfied, and sets a predetermined tendency and a predetermined value as the tendency and the output membership function value according to the respective fuzzy rule if the respective fuzzy rule is not satisfied.

11. The system of claim 10, wherein the controller determines the driving tendency when a distance to a preceding vehicle is greater than or equal to a predetermined distance, a curvature radius of an ahead road is greater than or equal to a predetermined curvature radius, the gradient of the road is smaller than or equal to a predetermined gradient, or a road state is not a slippery road, an icy road, a rough road or an unpaved road.

12. The system of claim 10, wherein the controller determines the driving tendency by overlapping the plurality of output membership functions on one tendency index graph, and calculating a center of an area occupied by the plurality of output membership function values on the tendency index graph.

* * * * *